US007216034B2

(12) United States Patent
Vitikainen et al.

(10) Patent No.: US 7,216,034 B2
(45) Date of Patent: May 8, 2007

(54) SYSTEM AND METHOD FOR AN INTELLIGENT MULTI-MODAL USER INTERFACE FOR ROUTE DRAWING

(75) Inventors: Timo Vitikainen, Espoo (FI); Panu Korhonen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/377,291

(22) Filed: Feb. 27, 2003

(65) Prior Publication Data

US 2004/0172191 A1   Sep. 2, 2004

(51) Int. Cl.
*G01C 21/30* (2006.01)
(52) U.S. Cl. ...................................... 701/208
(58) Field of Classification Search ........ 701/200–202, 701/206–209, 211–213; 342/357.13; 340/988, 340/990, 995
See application file for complete search history.

(56) References Cited

U.S. PATENT DOCUMENTS 5,473,324 A * 12/1995 Ueno .......................... 340/990
6,604,045 B2 * 8/2003 Kuroda et al. .............. 701/202
2001/0027375 A1 * 10/2001 Machida et al. ............ 701/209
2003/0093217 A1 * 5/2003 Petzold et al. .............. 701/201
2004/0153370 A1 * 8/2004 Yang ........................... 705/26

* cited by examiner

*Primary Examiner*—Thu V. Nguyen
(74) *Attorney, Agent, or Firm*—Hollingsworth & Funk, LLC

(57) ABSTRACT

A system and method for providing an interactive, multi-modal interface used to generate a route drawing. A mobile terminal display initially displays map data indicative of a user's region of interest. Through a series of audible, visual, and tactile excitations, the user interacts with the route drawing system to generate a desired route to be superimposed upon the user's region of interest. User preferences are used by the system to intelligently aid the user in selection of each segment of the route to be drawn. An analysis of each segment, as well as an analysis of the final route, is performed so that the attributes of the route, along with the graphical representation of the route itself, may be stored either locally within the mobile terminal or remotely within a map server.

21 Claims, 11 Drawing Sheets

SYSTEM AND METHOD FOR AN INTELLIGENT MULTI-MODAL USER INTERFACE FOR ROUTE DRAWING

FIELD OF THE INVENTION

This invention relates in general to facilitation of drawing arbitrary routes using a mobile terminal, and more particularly, to a multi-mode user interface within the mobile terminal that facilitates multiple drawing techniques.

BACKGROUND OF THE INVENTION

Creation of routing information has evolved from being primarily a pen-in-hand operation, to a more sophisticated method of electronic capture of user input. The more sophisticated methods of data capture comprise, for example, operations with a computer mouse, stylus with touch screen input, etc. Notwithstanding the technological advances of accepting electronic input from users, the task of generating free-hand drafts remains arduous. In fact, capturing detailed graphical data relating to directional information may present a greater challenge when performed electronically, as compared to traditional pen-to-paper methods of data capture. An electronic method such as mouse input, for example, provides an extremely unnatural method to convey graphical information, due to the awkward position of the user's hand in relation to the graphical medium being used to convey the user's inputs. A handheld device, such as a mobile terminal, now offers alternate means of data capture, through technological advances made to the mobile terminal throughout the last several years.

Advances in communication technology, for example, has elevated the usage of mobile terminals from simple voice transfer mechanisms, to elaborate data transceiver devices. Not only do conventional mobile terminals allow digital data transmission, but they also offer digital data reception from other mobile device users, network servers, service providers, etc. Technological advances in the display, memory and processing functions performed by these mobile terminals have virtually transformed the mobile terminal into a mobile computing/telecommunications platform, rather than merely just a communications device.

Accordingly, data input modes have also advanced to include voice command, touch screen, and keypad data entry. These data entry methods facilitate user interaction with a multitude of network applications such as, for example, internet access, content downloads from download servers, as well as peer-to-peer information transfer and local data storage. With a stylus and a touch screen, for example, a user of a mobile device is now able to capture graphical data input representative of, for example, directions relating to movement from point A to point B. The data input may, for example, be facilitated by allowing the user to trace out a desired path onto an existing graphical representation of a city map. The graphical representation of the city map being received, for example, by a content download of geographical information contained within a geographical information database maintained by a network service provider.

Even with stylus data entry, however, extremely close attention to detail is required to obtain a reasonably accurate representation of the desired route. Tracing the route along a desired path requires that the user maintain his stylus within the confines of the particular street or pathway that is projected by the electronic map onto his mobile device display. Any loss in concentration will inevitably lead to the necessity of erasing the errant stylus movement, thus creating an additional workload on the user in terms of time and effort, in order to generate an accurate representation of a route.

Particularly challenging data input scenarios include standing on a street corner in the rain, while attempting to draft a specific route onto a map projected by the mobile device's display. Such a scenario materializing, for example, in the event that a visiting citizen of a foreign country queries the user for directions to the closest grocery market. Another particularly challenging scenario occurs when the mobile device user is jogging along a pathway and wishes to record his progress along the way. In such an instance, it is virtually impossible to accurately trace movement along the jogging path by using any form of data entry requiring hand/eye coordination.

One conventional method of tracing the movement of a data terminal, involves the use of the global positioning system (GPS). In such an implementation, the data terminal is required to have communications equipment capable of receiving timing and position information from at least 3 GPS satellites simultaneously, whereby time and position is derived. Such a system, however, requires an investment of hundreds of dollars for the specialized receiving equipment that is necessary. Additionally, the user is required to have unimpeded communication to multiple GPS satellites, thus making GPS navigation a challenge in a skyscraper rich downtown area, or conversely, a densely wooded forest.

Accordingly, there is a need in the communications industry for a system and method that facilitates route information capture, even in the most demanding data entry modes of use, such as while walking, jogging, roller-skating, bicycling, etc. In addition, the system and method should contemplate the usage of a multi-modal data entry mechanism that is assisted by geographical data from a network server, so as to facilitate an interactive drawing session. The present invention fulfills these and other needs, and offers other advantages over the prior art.

SUMMARY OF THE INVENTION

To overcome limitations in the prior art, and to overcome other limitations that will become apparent upon reading and understanding the present specification, the present invention discloses a system, apparatus and method for implementing electronic route drawing using a mobile terminal within a network. The mobile terminal allows multi-modal command input coupled with intelligent use of preference data to facilitate the route drawing.

In accordance with one embodiment of the invention, a method is provided for generating a route drawing on a mobile terminal display. The method comprises displaying map data indicative of a region of interest on the mobile terminal display, setting user preferences associated with the route drawing, and using multi-modal excitations to cause multiple route segments of the route drawing to be superimposed upon the region of interest, wherein the user preferences are used to prioritize placement of the multiple route segments.

In accordance with another embodiment of the invention, a route drawing system is provided. The route drawing system comprises a map data server coupled to provide map data to a network, a rendering module coupled to receive the map data and coupled to provide a rendered version of the map data indicative of a region of interest, a mobile terminal display coupled to receive and display the rendered version of the map data, a preference module coupled to provide user preferences relating to a route drawing, and a route drawing module coupled to combine control input with the user preferences to generate prioritized route segments, wherein the route segments are interactively superimposed onto the rendered version of the map data to define the route drawing.

In accordance with another embodiment of the invention, a mobile terminal wirelessly coupled to a network which includes a network element capable of providing graphical data. The mobile terminal comprises a memory capable of storing at least one of a user interface module, a geographic information module, and a streaming client; a processor coupled to the memory and configured by the streaming client to enable transfer of graphical data to the geographic information module for subsequent display on the mobile terminal, and a transceiver configured to receive the graphical data from the network element and configured to provide route segment placement commands to the network element to be superimposed onto the graphical data.

In accordance with another embodiment of the invention, a mobile terminal wirelessly coupled to a network which includes a network element capable of providing graphical data. The mobile terminal comprises a memory capable of storing at least one of a user interface module, a geographic information module, and a streaming client; a transceiver configured to receive the graphical data from the network element, and a processor coupled to the memory and configured by the streaming client to enable transfer of graphical data to the geographic information module for subsequent display on the mobile terminal and configured by the user interface module to superimpose route segments onto the graphical data.

In accordance with another embodiment of the invention, a computer-readable medium having instructions stored thereon which are executable by a mobile terminal for generating a route drawing on the display of the mobile terminal is presented. The steps performed comprise displaying map data indicative of a region of interest on the mobile terminal display, accepting user preferences associated with the route drawing, receiving multi-modal excitations indicative of route segment placement commands, and superimposing multiple route segments on the region of interest, wherein the user preferences and the route segment placement commands are used to optimize placement of the multiple route segments.

In accordance with another embodiment of the invention, a map server within a network used to facilitate electronic route drawings is provided. The map server comprises means for storing graphical data indicative of a region of interest, means for receiving route segment placement commands, means for superimposing route segments onto the region of interest in response to the route segment placement commands to create the electronic route drawing, and means for providing the electronic route drawing to network devices within the network.

In accordance with another embodiment of the invention, a computer-readable medium having instructions stored thereon which are executable by a map server for facilitating an electronic route drawing is presented. The steps performed comprise transmitting rendered graphical data representative of a region of interest, receiving route placement commands to indicate a desired location of route segments on the region of interest, generating attributes of the desired route segments, and transmitting composite graphical data, wherein the composite graphical data includes a combination of the route segments superimposed onto the region of interest and the attributes associated with the route segments.

BRIEF DESCRIPTION OF THE DRAWINGS

The invention is described in connection with the embodiments illustrated in the following diagrams.

DETAILED DESCRIPTION OF THE INVENTION

In the following description of the exemplary embodiment, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention is directed to an intelligent, multi-mode route drawing apparatus and technique. In accordance with the invention, the user can interactively draw arbitrary map routes using a mobile terminal, without the need for complex, supporting technologies such as positioning systems or other location-based services. The user may control the manner in which routes are created with the multi-mode user interface (UI) features of the mobile terminal.

Figure 1:
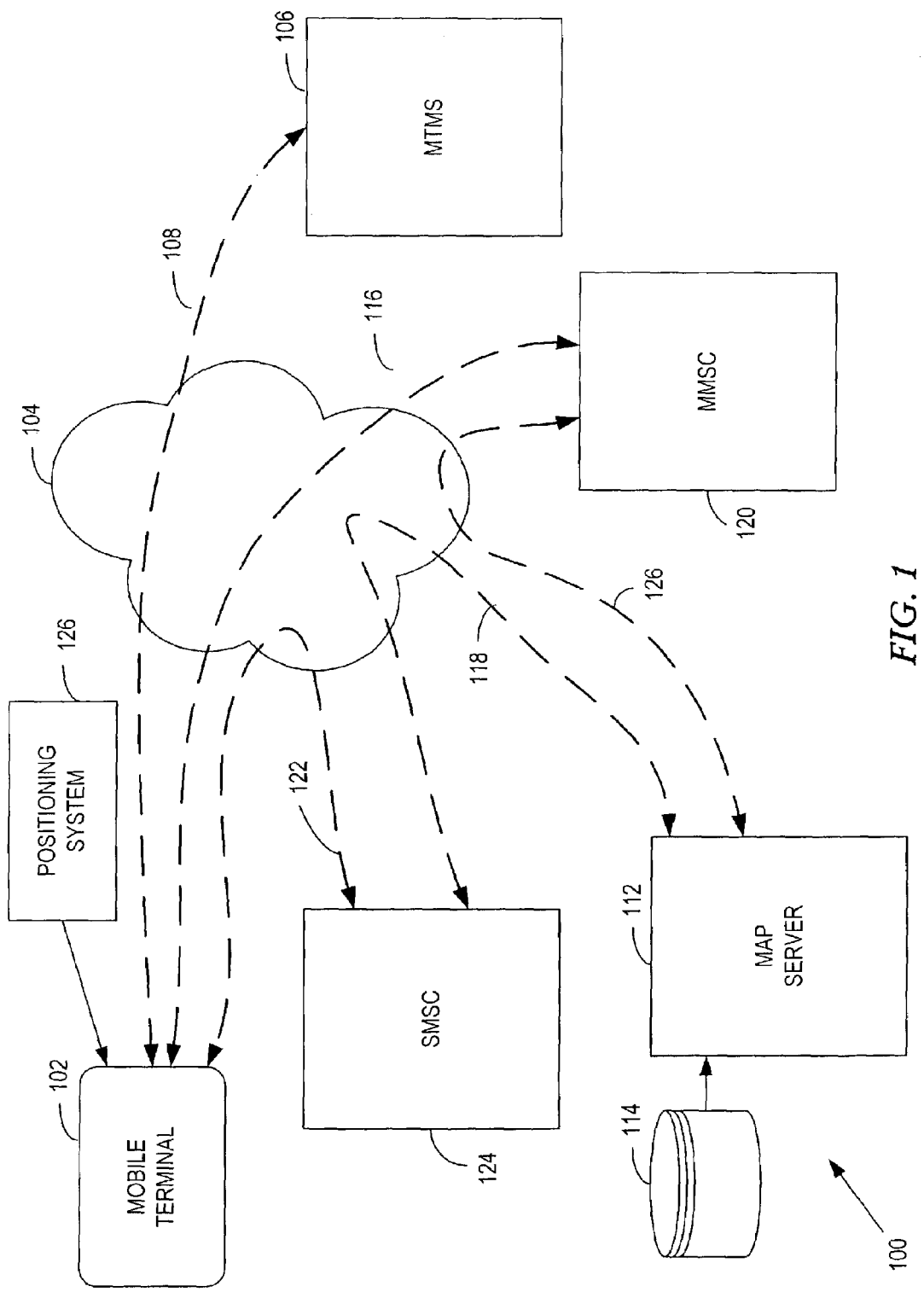
FIG. 1 illustrates a representative networking environment in accordance with the present invention.

FIG. 1 illustrates an exemplary networking environment 100 in which the principles of the present invention may be practiced. In particular, a networking environment is presented with respect to the provisioning of mobile terminal 102, such that mobile terminal 102 may be interoperative with map server 112 to initiate a content download from map server 112 consisting of, for example, geographical information that is pertinent to map information requests made by mobile terminal 102.

Map server 112, in combination with database 114, illustrates an exemplary network service that provides geographical information that may be illustrated as a map on the display of mobile terminal 102. Mobile terminal 102 may provide data requests to map server 112 via, for example, a Wireless Application Protocol (WAP) gateway (not shown) contained within network 104 that supports various WAP services. Exemplary services supported by the WAP gateway include a Multimedia Messaging Service (MMS) and a Short Messaging Service (SMS) that are made available via Multimedia Message Service Center (MMSC) 120 and Short Message Service Center (SMSC) 124, respectively. The particular mode of access available to the mobile terminal 102 may be a function of the provisioning parameters provided to mobile terminal 102 by Mobile Terminal Management Server (MTMS) 106.

In the illustrated embodiment of FIG. 1, mobile terminal 102 may be provisioned with information regarding MMS access to MMSC 120, or alternatively, with SMS access to SMSC 124. In particular, mobile terminal 102 is provisioned with the service number associated with map server 112, so that mobile terminal 102 may initiate content transfer from map server 112. Alternatively, mobile terminal 102 may be provisioned with the Unique Resource Link (URL) that is associated with map server 112. In any case, once provisioned, mobile terminal 102 is enabled to request geographical information from network 104 that not only relates to the user's current position, or some other position selected by the user, but also to the surrounding geographical data associated with the user's selected position. Map server 112 receives geographic information updates at regular intervals from database 114, in order to facilitate up-to-date route mapping by mobile terminal 102.

It should be noted that an identification of the map server 112 need not be provisioned in advance. In other embodiments, the network server identification may be provided to a terminal by way of the content itself. For example, a URL for a geographical data service may be provided in a download descriptor such as a Java Application Descriptor or Download Descriptor file.

Positioning system 126 provides an optional resource used by mobile terminal 102 to facilitate operation of the present invention. Positioning system 126 may be, for example, a GPS system in communication with mobile terminal 102, such that mobile terminal 102 may ascertain its own location. Once the location of mobile terminal 102 is known, any requests for map data made by mobile terminal 102 to map server 112 may include the location of mobile terminal 102, so that map server 112 may provide data relative to the mobile terminal's current position.

In order to illustrate at least some of the advantages provided by the present invention, a temporal sequence is presented, in which a mobile terminal user is out for her daily exercise. In an effort to obtain added variety to her daily exercise routine, she wishes to plot a jogging path that interludes into a portion of nearby forest land. She does not, however, have any familiarity with the particular forest land and, consequently, is concerned with the possibility of becoming lost. Brandishing a mobile terminal according to the principles of the present invention, she begins to plot her new jogging path by first requesting map data of the surrounding area to be downloaded from a map server.

Since the mobile network has authenticated her subscriber and mobile equipment identities, the mobile network is also aware of her approximate position, or in an alternate embodiment, her exact position is known through GPS or some other position determination service. In alternative embodiments, she may simply enter coordinates, points of interest, or an address in order for the mobile network to ascertain her desired region of interest. At any rate, her request for map data of the surrounding area is then processed by the map server associated with her network service provider based upon her location of interest. The map data is then downloaded from the map server to her mobile terminal and subsequently displayed on her mobile terminal's display. She is then able to view the latest map data of the surrounding area of interest along with all of the known routes that are traversable within the area.

Since she has requested that a portion of her route include forest land, those portions of the displayed map that include forest land are held at a higher priority and made to be preferably distinct from other prospective portions of a proposed jogging path. Thus, by prioritizing a path that includes forest land, the mobile terminal assists the formation of the jogging path in an intelligent manner by incorporating her desire to run along paths surrounded by forest land. Through the use of a combination of voice, touch screen, keypad, or acceleration/tilt sensor commands, for example, she is able to communicate to the mobile terminal her incremental path requirements for the run.

Figure 2:
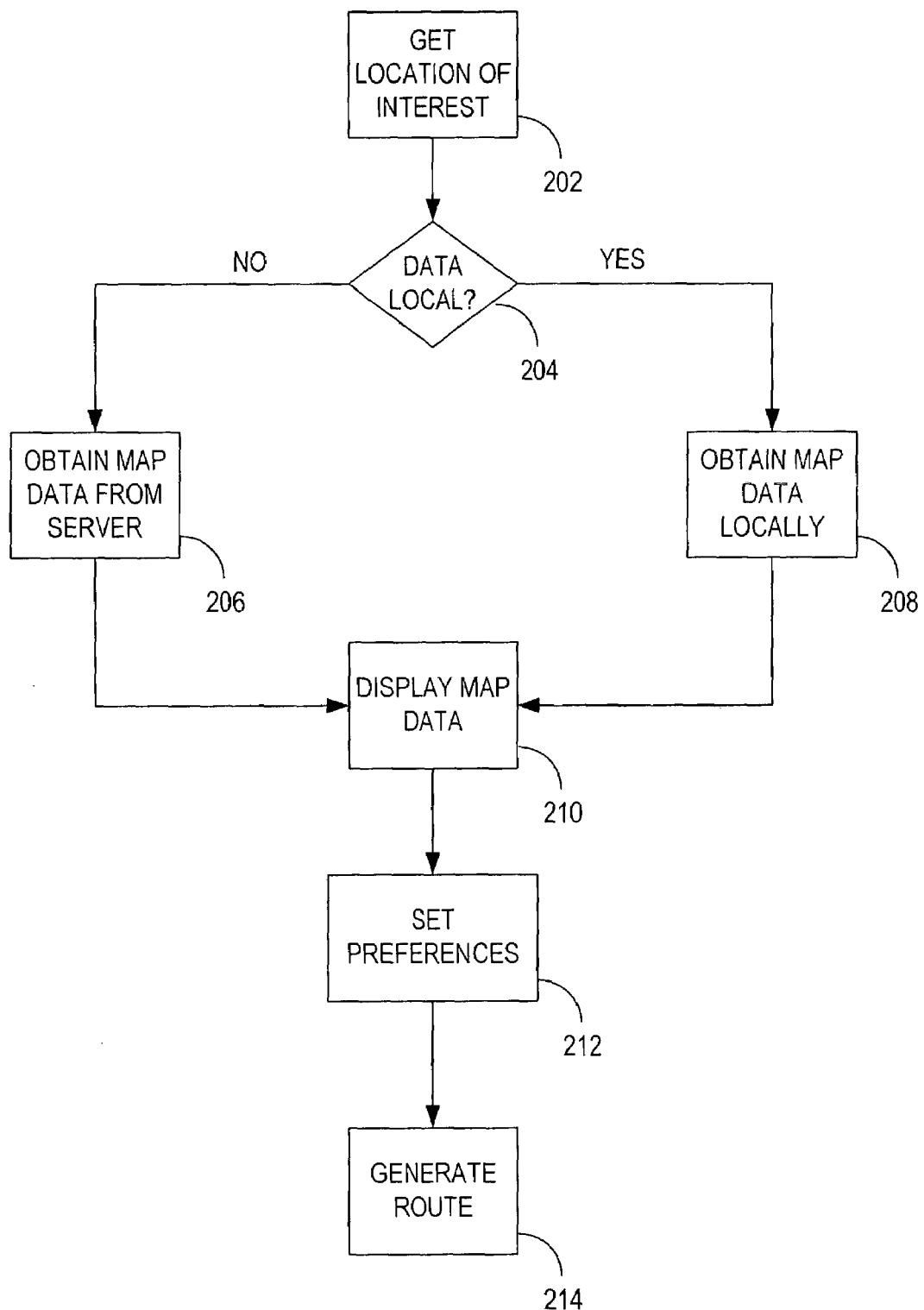
FIG. 2 illustrates a flow diagram of exemplary route drawings steps taken in accordance with the present invention.

Reference to the flow diagram of FIG. 2 illustrates exemplary route plotting steps that may be taken in accordance with the present invention. In order to restrain the plot to a region of interest, the user may communicate a central datum point to the mobile terminal as in step 202, such that the central datum point becomes the center position of the map to be displayed along with the surrounding information, thus defining a particular region of interest. The central datum point may be communicated in any number of different ways. The user for example, may simply key in an address of interest, specific coordinates, or points of interest via a keypad located on the mobile terminal, or alternatively, the user may use voice commands to communicate the central datum point. In other embodiments, the central datum point may be the actual position of the mobile terminal that has been predetermined by a positioning system, such as GPS. Still in other embodiments, the user may wish to pinpoint a central datum point on a map that is currently within the viewable display of the mobile terminal. In such an instance, the user simply picks the central datum point by selecting a point on the viewed map using a stylus, mouse, or any other suitable pointing device. Once the central datum point is selected, the range of interest may also be selected by the user so as to control the size of the region of interest which surrounds the central datum point. The region of interest may also be defined by simply taking a circumference around the central datum point according to a selectable circumference radius.

Map data representative of the region of interest may either be stored locally within the mobile terminal, in which case, the Yes path of decision 204 is taken, whereby map data is retrieved from local memory as in step 208. Alternatively, map data representative of the region of interest may not be located locally to the mobile terminal, in which case, the No path of decision 204 is taken, whereby map data is retrieved from a map server as in step 206. The map data may then be displayed to the user via the mobile terminal's display as in step 210.

At step 212, the user may enter certain preferences to allow customized facilitation of the desired route plotting exercise. For example, the user is able to define the type of route to be plotted, whether it be for jogging, biking, roller skating, driving a car, or even to plot a ground track for flight operations, since flight chart data may also be available from the map server. Since the user is interested in defining a jogging path, she is able to enter supportive preference information as desired, to serve as prioritization parameters used by the mobile terminal to intelligently aid in the formation of a highly pleasurable and fulfilling jogging path. Preferential data may include, for example, the preferred route type, such as highway, scenery road, footpath, paved bicycle route, etc. The preferential data may also exclude undesirable routes, such as for example, highways or unpaved roads. Topographical data to include elevation, maximum uphill or downhill slope, and mountainous terrain may also prove beneficial when plotting an extra vigorous jogging route.

By entering preferential data, the user activates a feature of the present invention that allows the routing tool to highlight potential paths to be taken within the region of interest that pertains to her most highly prioritized features. For example, since forest surroundings are desired during the run, the routing tool may highlight a path that is the shortest path from her desired starting point to the surrounding forest area. The user then may select the prioritized path as it is displayed on the mobile terminal, or the user may simply request an alternate path to be suggested. As each increment of the path is selected, new path segments are displayed according to the user's preferences until the entire path is completed, as in step 214.

Figure 3:
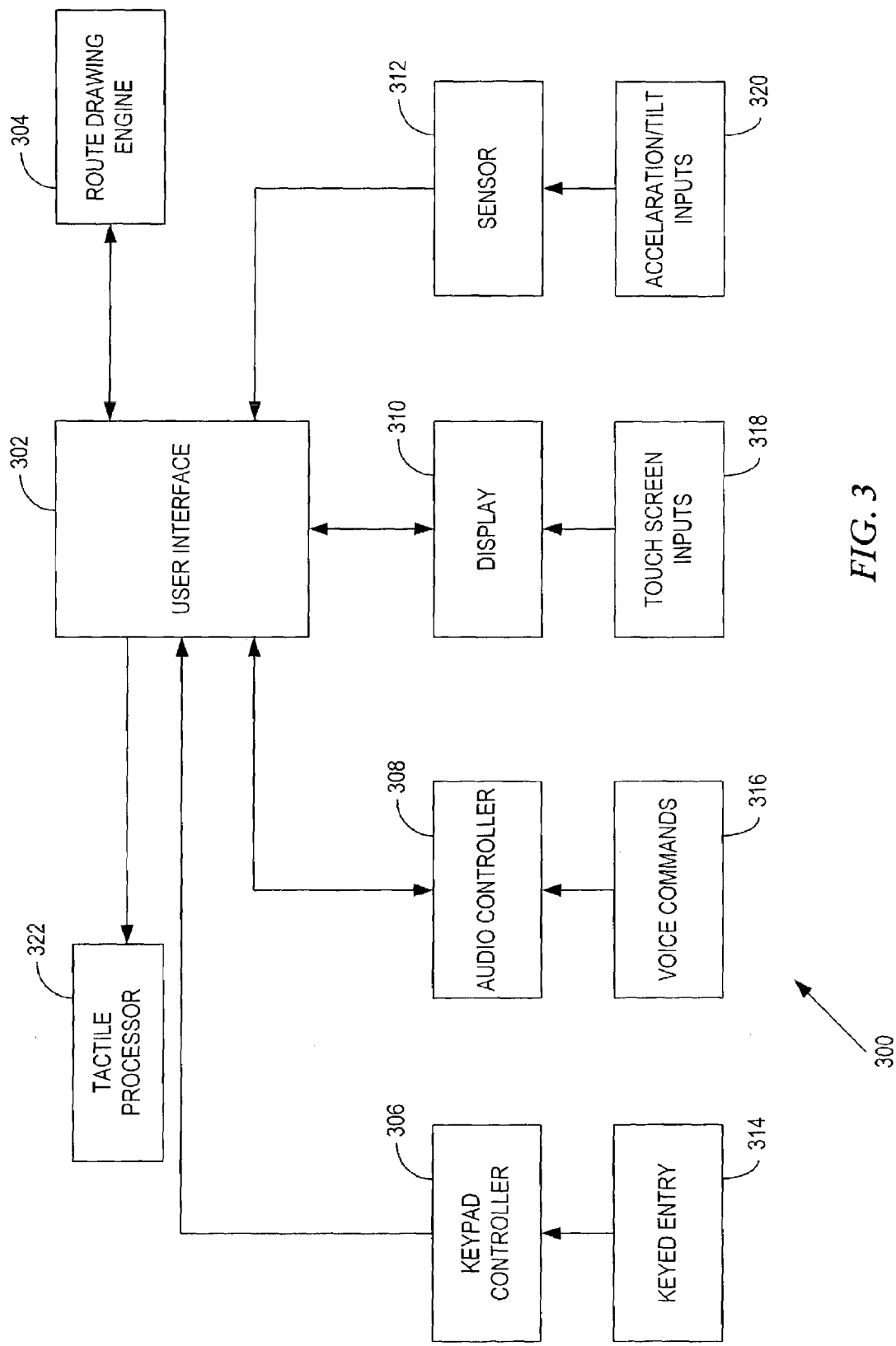
FIG. 3 is a multi-modal input block diagram in accordance with the present invention.

FIG. 3 illustrates exemplary multi-modal block diagram 300 according to the present invention. User interface 302 receives control inputs from keypad controller 306, audio controller 308, display 310, and sensor 312 and provides the control inputs to route drawing engine 304 for processing. In response, user interface 302 provides feedback to the user via tactile processor 322, audio controller 308 and display 310. Each of the control input mechanisms serve to receive user input, which when combined with the intelligent operation of route drawing engine 304, serves to create a highly efficient, and interactive mode of creating route drawings for future use.

Table 1 illustrates an exemplary list of possible commands and their input type that may be used by route drawing engine 304 during the course of a typical drawing exercise. This list is provided for purposes of example, and not of limitation.

TABLE 1

| "Command"/Prompt | I/O Type | Function |
|---|---|---|
| "select drawing" | K, D, V | Invokes route drawing algorithm |
| "select center" | K, D, A, V | Selects center of drawing |
| "select start" | K, D, A, V | Selects starting point on drawing |
| "return" | K, D, V | Selects final segment prioritized by preference |
| "run until" | D, V | Selects incremental leg with endpoint |
| "continue until" | K, D, V | Selects most logical path as prioritized by preference |
| "turn right" | K, D, A, V | Continues movement along most probable path to the right prioritized by preference |
| "turn left" | K, D, A, V | Continues movement along most probable path to the left prioritized by preference |
| "north"; "south"; "east"; "west" | K, D, A, V | Designates direction for next segment |
| "back"; "erase" | K, D, A | Allows erasure of any number of plot segments |
| "zoom in"; "zoom out"; "scroll up"; "scroll down"; "scroll left"; "scroll right". | K, D, V | Provides image rendering commands |
| "then" | K, D, V | Connector used to combine commands |
| attributes | T, D, A | Communicates path, landmark, or other attributes to user |
| wait state | T, D, A | Prompts user for input |

Keypad controller 306 receives keyed entries 314 from the user as one form of multi-modal interaction with route drawing engine 304. Input type "K" as depicted in Table 1 denotes keypad entry. Likewise, audio controller 308 receives voice commands 316 and are depicted as a "V" input type as in Table 1. Touch screen inputs 318 via display 310 are denoted as "D" in Table 1. Finally, sensor 312 receives directional acceleration/tilt input information 320, depicted as "A" in Table 1, through sensing acceleration and directional forces on the mobile terminal itself as control input. Finally, tactile processor 322 provides touch sensitive feedback, depicted as "T" in Table 1, to the user when, for example, route drawing engine 304 awaits further control input from the user.

For user prompts or other communication to the user such as for the attributes and wait state entries, the T, D, A types correspond to representative output types to prompt or otherwise notify the user of particular things. For example, for the "attributes" entry, any one or more notification outputs such as audio (A), visual (D), tactile (T), and the like may be used to communicate attributes of a route to the user. Such attributes may include path condition and landmarks of interest, or any other type of information of interest along the route. Other examples may include permanent or temporary hazards along the route that may be presented via such attributes, such as flooded path, crime risks, construction area, etc.

It will be appreciated by one of skill in the art from the description provided herein that command inputs to UI 302 and prompts provided by UI 302 may have any number of different options and combinations. The commands, prompts, and I/O type found in Table 1 are merely illustrative of an exemplary subset of multi-modal input commands and prompts and are not intended to be limiting in any way.

An exemplary route drawing method in which the principles of the present invention are used is illustrated in FIGS. 4–7. In such a method, an interactive route drawing mode is assisted by geographic data that is either retrieved from a map server or that is locally stored within the memory capacity of the mobile terminal itself. The method allows optimization of the route drawing, such that the routes relate to the user's current task, e.g., jogging, roller skating, bicycling, driving a car, etc. and is bound by the geographic data displayed. The method allows a linear drawing process that resembles a drawing that would be created by a conventional pen-to-paper or stylus-to-display technique, where the speed of the process may be controlled by the user and is adapted to the particular task. The user is able to interact with the drawing process in a variety of input modalities including speech, keyed entry, contact to display, acceleration/tilt detection, etc.

Multiple modalities may be used simultaneously or in direct sequence to accomplish the drawing task. A user, for example, may emit a verbal command, stating: "turn right at this crossing, then turn left at the next crossing", where the system parses the string into multiple commands, e.g., "turn left" and "turn right", and the word "then" is used in combining the commands in sequence to effect the desired route request. Additionally, mixed modal inputs may be used to effect a particular result. For example, a user may emit the following verbal command: "turn left here", whereby the point at which the route is taken to the left is denoted by a subsequent stylus tap, or mouse click, on the display.

Figure 4:
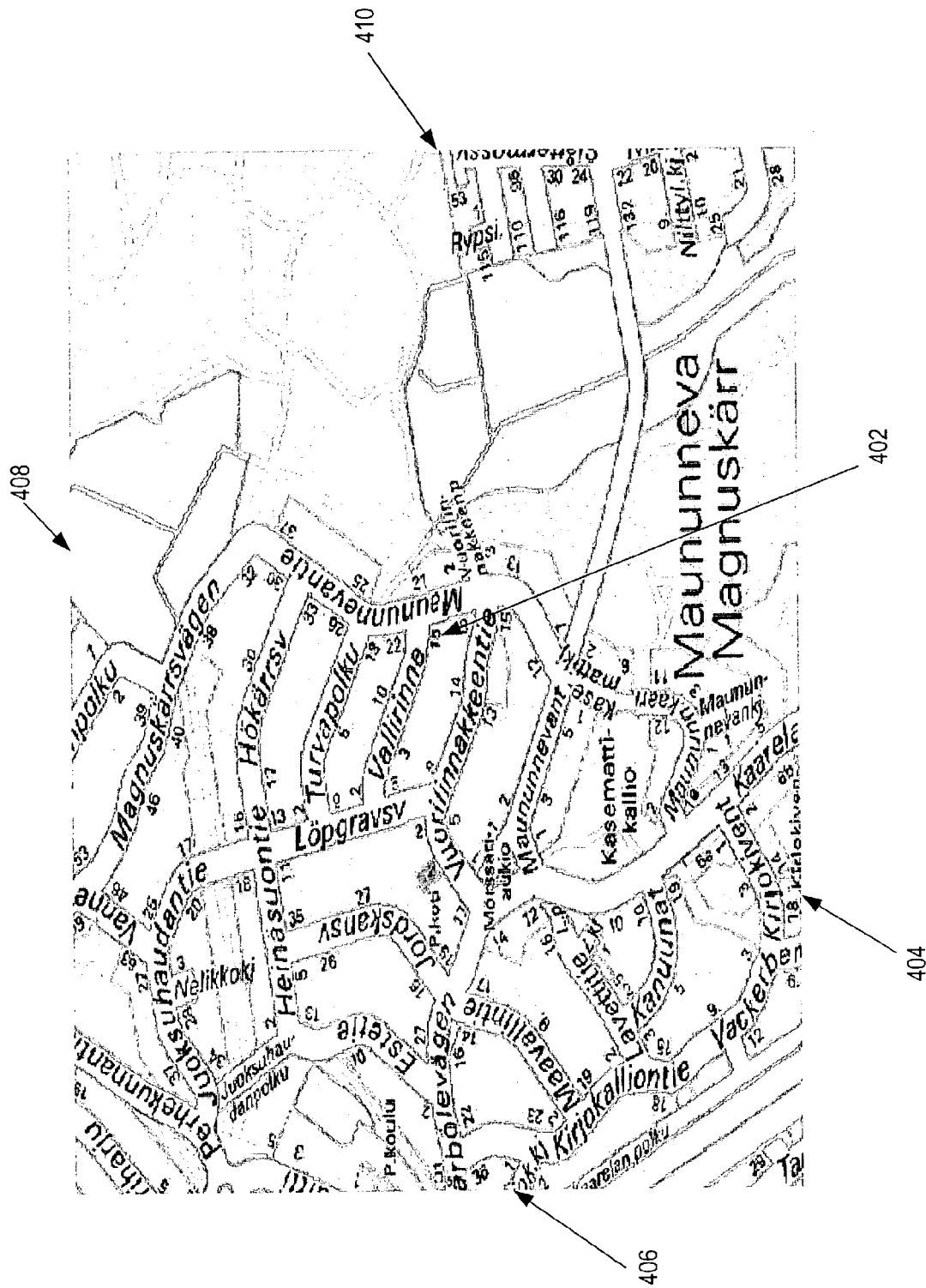
FIGS. 4–7 illustrate an exemplary route drawing output in accordance with the present invention.

FIG. 4 represents a typical map display resulting from a user's initial route drawing request. The user issues a "select drawing" request followed by a "select center" request, followed by a "select region" request where the requests may be issued, for example, via verbal, keystroke, or display inputs. The command "select center" allows the user to select the center datum point that denotes the center of the map display of interest. The center datum point may be entered in many different formats including; address, coordinate, or display input. One format used for center datum point entry could correspond to an address string such as "Vallirinne 15" or a coordinate string such as "060°10'59"N 022°15'00"E", where either expression denotes the center datum point 402 of FIG. 4. The center datum point may also be selected by pointing to an area on the display of the mobile terminal that is projecting an area map of interest. By tapping on the display using a stylus, or by point-and-click entry using a mouse, the user is able to select a point on the area map that represents the center datum point. Once selected, the map is redrawn on the mobile terminal's display, where the center point of the newly drawn map corresponds to the center datum point just selected.

The "select region" request allows the user to define the region of interest, whereby the region may be described in any number of formats, such as a numerical entry corresponding to the area of the region, e.g., 5 square miles. A preference variable may also be set that corresponds to the preferred geometric shape of the region area, e.g., circular, square, or rectangular, where region boundary parameters 404–410 of FIG. 4 define a rectangular region.

Figure 5:
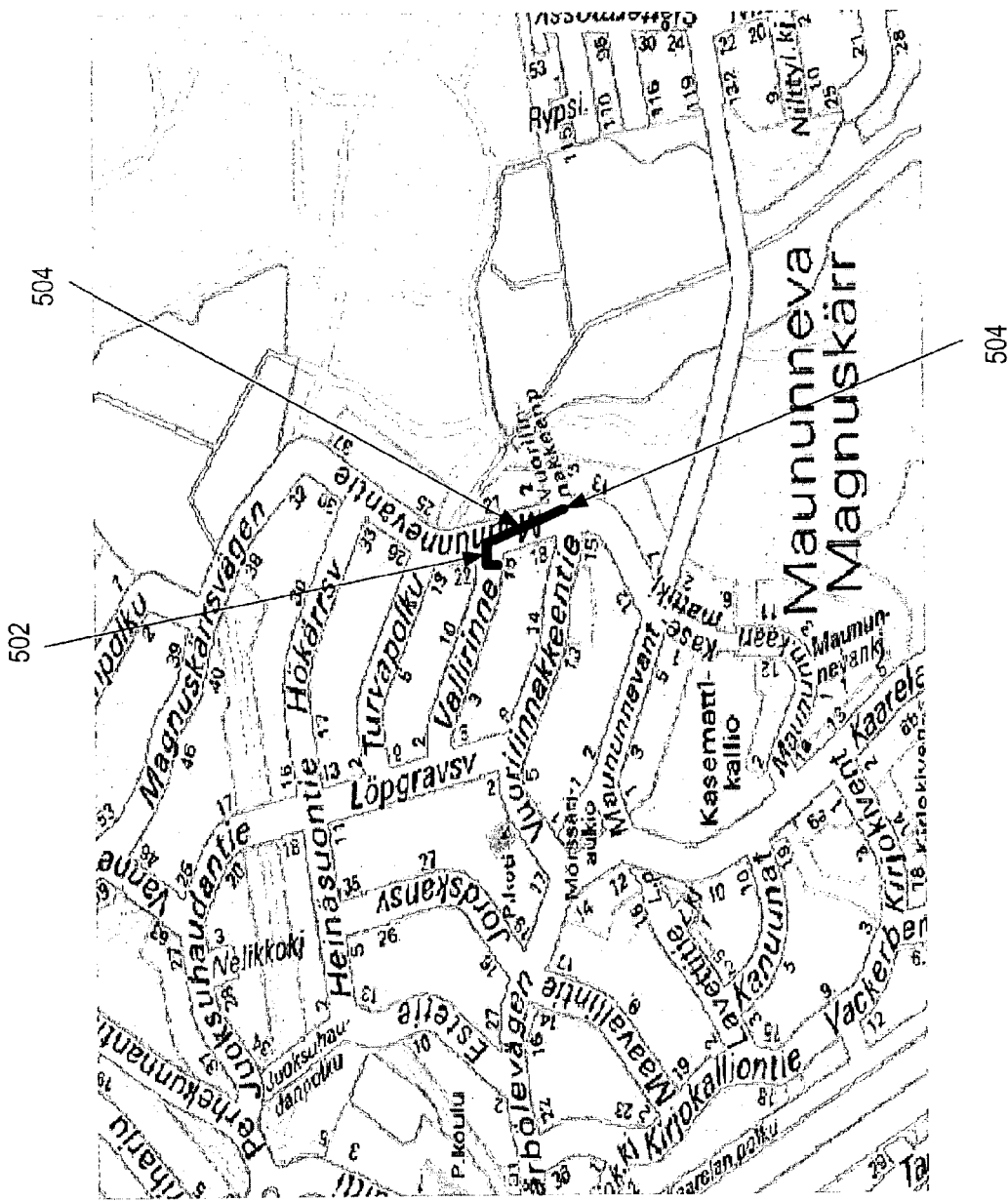

FIG. 5 illustrates the results of the concatenated command: "turn right on Vallirinne then turn right at next crossing". The center datum point, "Vallirinne 15", by default serves as the starting point of this exemplary route drawing. Alternatively, the user may have also issued a "select start" command in order to select any point of the map illustrated in FIG. 5 as the starting point of the drawing. Segment 502 results from the first parsed command of the concatenated command: "turn right on Vallirinne" because Vallirinne 15 is the starting point and segment 502 encounters its first crossing at Maununnevantie. Once the route drawing reaches the crossing, segment 504 results, since the second parsed command from the concatenated command states: "turn right at next crossing", which is the point at which the crossing of Vuorilinnakkeenp is encountered. Once endpoint 506 has been reached, no other parsed command exists to further instruct the route drawing process. At this point, therefore, the mobile terminal enters into a wait state and issues an indication to the user that further route drawing instructions are required. Any number of indications to the user may be used to indicate the need for further route drawing instructions. For example, route segment 504 may begin to blink, indicating that route segment 504 was the last segment drawn since receipt of any route drawing commands. Further, a tactile or audible sensation may be issued by the mobile terminal in the form of, for example, a vibration or beep, where the sensation would help engage the user if the user's attention was not focused upon the display at the time the input was needed.

Figure 6:
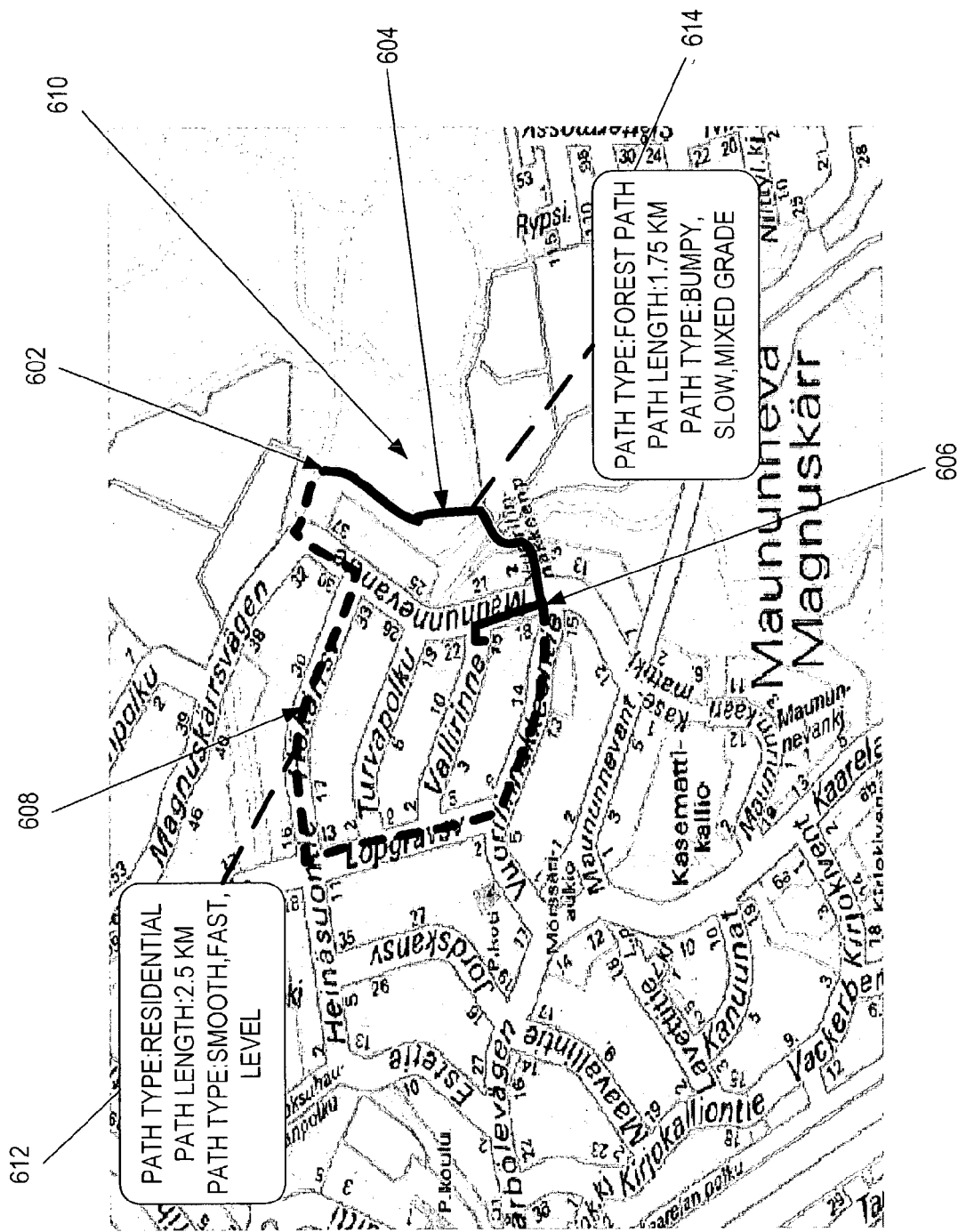

FIG. 6 illustrates the results of a command that utilizes the preferences of the user in order to prioritize the route drawn. For example, the user has designated that a jogging path is to be drawn, whereby a forest path is desired. Once point 606 has been reached, the route drawing processor receives the next user command: "continue until", whereby an indication on the display, either with a stylus tap on the display or a mouse click, is required to mark the endpoint of the next segment. After issuing the "continue until" command, the user indicates that endpoint 602 is the required endpoint. The route drawing processor then must make a decision as to the path required to reach endpoint 602. Path 608 designates one such possible route that satisfies the requirement that endpoint 602 mark the end of the segment. However, path 608 does not traverse any part of forest area 610 and, therefore, violates one of the user's preferences. Path 604, on the other hand, does traverse forest area 610, in accordance with the user's preference for this particular route drawing session. The routes 608 and 604 are then prioritized according to the user preference of a forest path, which results in the selection of route 604 as the desirable route to take. Accordingly, route 604 is maintained as the preferred route, while route 608 is discarded.

In an alternate embodiment, the user may have selected as a preference, the ability to choose between a multitude of alternate path routes. Path routes 604 and 608 would then be displayed simultaneously. In addition, attributes of path 604, e.g., 614, and attributes of path 608, e.g., 612, are also displayed in order to facilitate the user's decision. The attributes of path 608 indicate that the path is residential having a 2.5 kilometer (km) path length and that the path type is smooth, fast and level. The attributes of path 604, on the other hand, indicate a forest path having a length of 1.75 km that is bumpy, slow with both uphill and downhill components, e.g. mixed grade. Since the user wishes a jogging path to include a forest path, she would select path 604 by command and path 608 would be discarded as a result.

It should be noted that path attributes may also be provided to the user via audible means, such as voice, various sounds, etc. Additionally, during the drawing of the selected path on the display, the attributes of that path can also, or instead, be communicated via a tactile cue. In this manner, users can "feel" the attributes (e.g., uphill/downhill, path condition, etc.) of the selected path via the mobile terminal that is held in the user's hand, strapped to the user, etc. Such a tactile cue may be used in lieu of, or in addition to, other cues such as visual, audio, etc. Any type of attributes may be communicated in these manners. For example, attributes pertaining to landmarks or other places of interest along the route (or at least at locations within the region of interest) may also be displayed, audibly communicated, and/or communicated by tactile means, or other notification technique.

Figure 7:
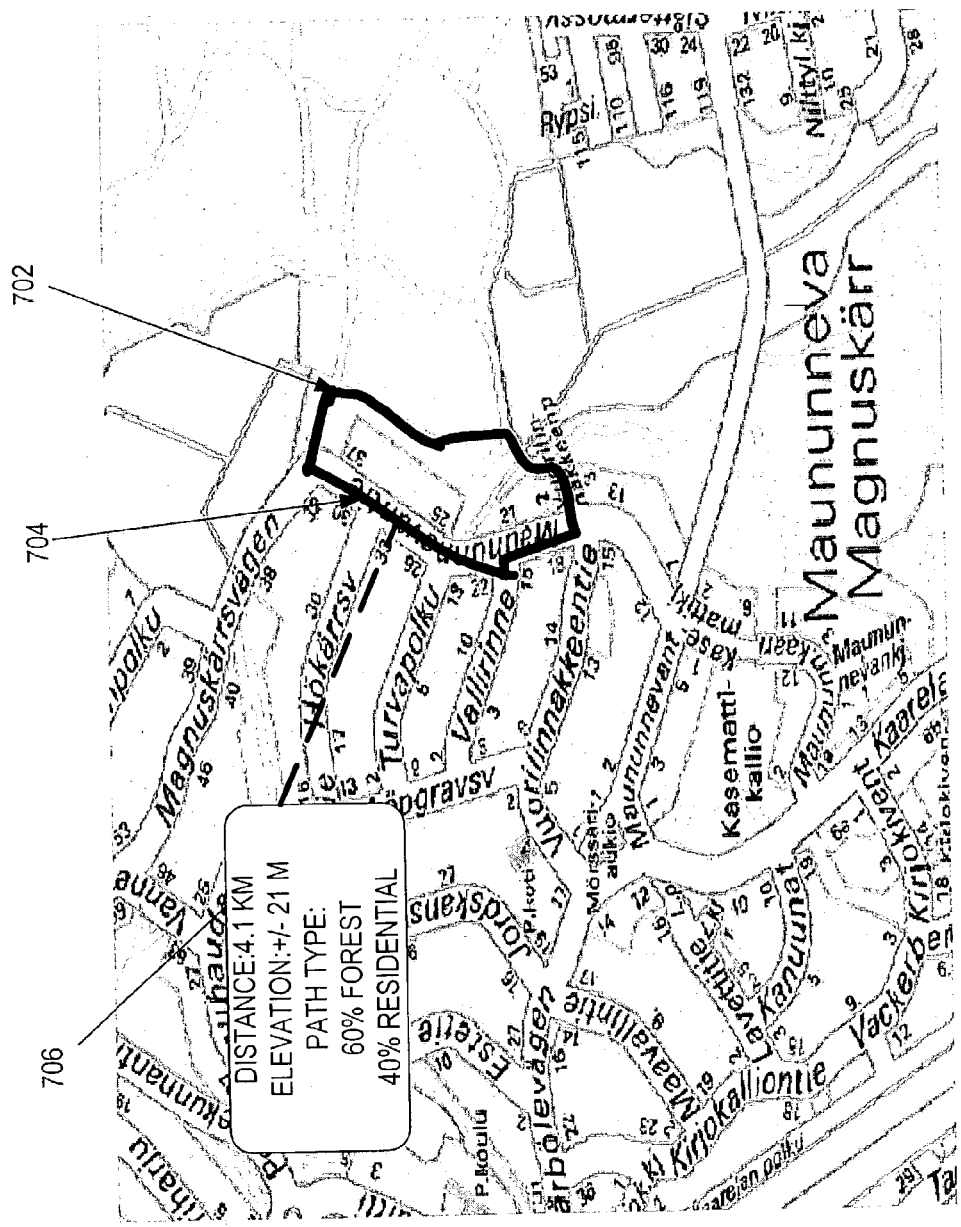

FIG. 7 illustrates the final step to be taken in order to complete the drawing route for this session. Once endpoint 702 has been reached, another wait state is entered, whereby the mobile terminal prompts the user for additional route instructions. Upon receipt of the following command: "return", the route drawing processor generates segment 704 because the "return" command causes a route to be completed to the starting point of the route drawing. Further, the final segment is such that a minimization of the path segment distance is achieved. Once the route drawing is complete, final analysis of the route parameters yields a final route result, such as displayed in result 706. Result 706 indicates that the jogging path length is 4.1 km in length and has a positive vertical deflection of 21 meters (m) and a negative vertical deflection of 21 meters. Additionally, statistics as to the path type have accumulated resulting in a 60% proportion of the path length being along a forest route and a 40% proportion of the path length being along a residential route. The completed route illustrated by FIG. 7 may now be saved into mobile terminal memory space for later retrieval and usage, or conversely, downloaded to a map server maintained by the user's network service provider.

Figure 8:
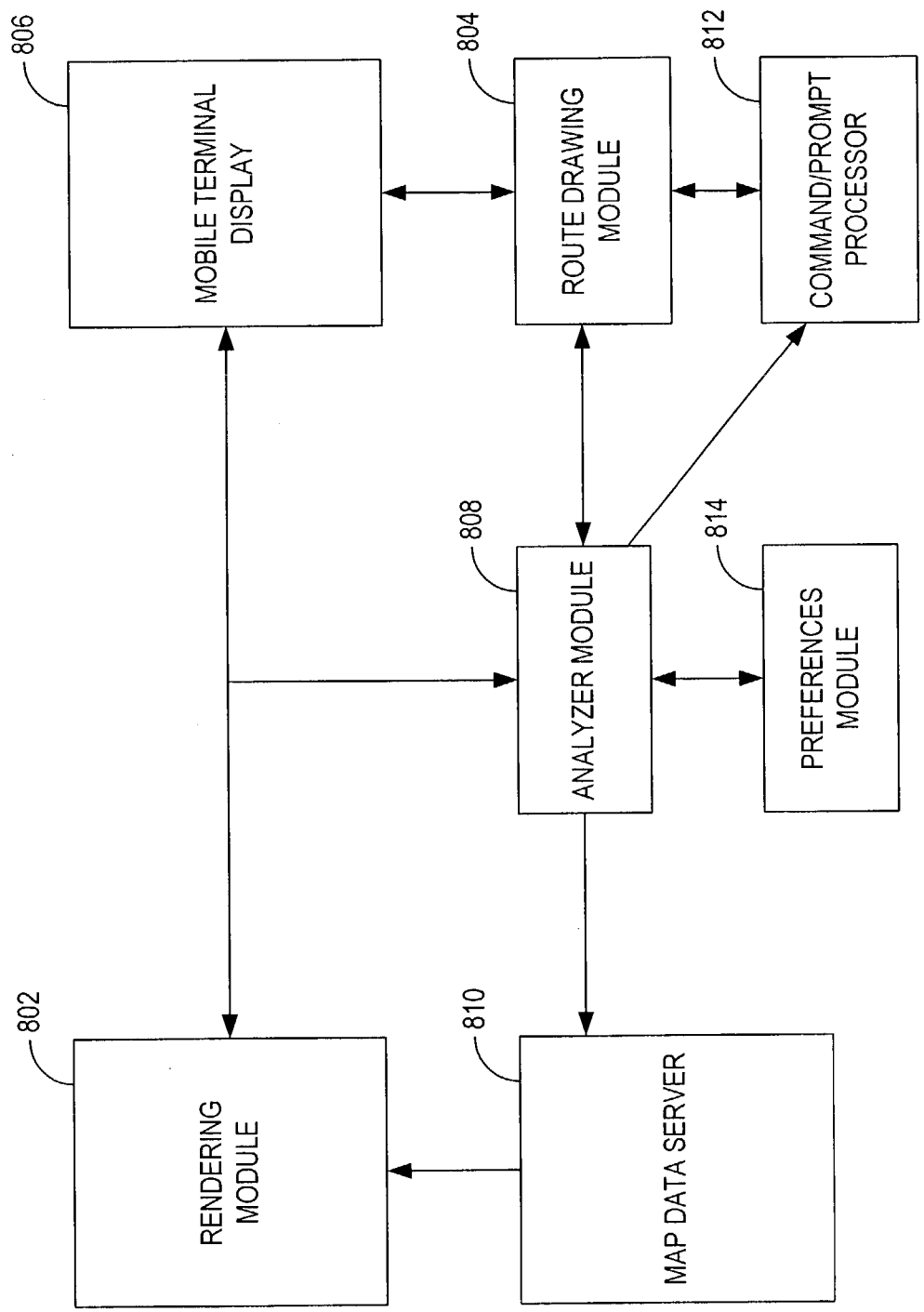
FIG. 8 illustrated a block diagram of an interactive route drawing system according to the present invention.

FIG. 8 illustrates an exemplary functional block diagram of an interactive route drawing system according to the present invention. Map data server 810 provides map information to rendering module 802, where rendering module 802 segments the map data into a partition that is viewable by mobile terminal display 806. Route drawing module 804 superimposes the route drawing segments onto mobile terminal display that are commanded by command/prompt processor 812. Analyzer module 808 recognizes different route types described by rendering module 802 and interacts with route drawing module 804 to force the superimposed route drawing segments into compliance with the user's preferences supplied by preferences module 814. In one embodiment, map data server 810 may be used to store the user's final route drawing and associated route attributes for future use.

Route drawing module 804 superimposes the route drawing segments onto mobile terminal display 806 at a reasonable speed, allowing the user to interact with the drawing process. Interaction with the drawing process is required such that the user may correct/analyze each segment of the route drawing according to direction, elevation, path length, path type, path slope, etc. For example, route drawing module 804 interacts with analyzer module 808 to provide the user with attribute data that is associated with the particular route segment of interest. Certain attributes associated with each segment may include path type, e.g., jogging, bicycling, roller skating; or topographical representations such as path elevation, path slope, or path condition, i.e., bumpy/smooth, fast/slow, or variations in elevation. As the path segments are superimposed upon the map displayed by mobile terminal display 806, the attributes of the path segments are also displayed, so that the user may make a determination as to whether or not to keep the segment under consideration. In addition, the drawing speed may be controlled through preference settings contained within preferences module or in real time during the route drawing session.

Route drawing module 804 provides several output options to both mobile terminal display 806 and command/prompt processor 812. For example, a graphics output is required to superimpose the route drawing onto the map displayed by mobile terminal display 806, whereas a textual output is also required for appropriate labeling of the paths and their attributes. In addition, route drawing module 804 provides audible, visual, and tactile prompts to command/prompt processor 812 in order to signal a wait state, when route drawing module 804 is stalled waiting for user input. For example, a voice prompt: "Next direction, please" may be provided by route drawing module 804 to command/prompt processor 812 when waiting for the next route segment command from the user.

Route drawing module 804 is controlled by control inputs from analyzer module 808 and control inputs from command/prompt processor 812. In particular, analyzer module 808 recognizes different route types and route attributes that are contained within the rendered map displayed on mobile terminal display 806. As such, intelligent decisions can be made about subsequent route segments when their attributes are compared with the preferences defined by preferences module 814. For example, when route drawing module 804 encounters a route crossing displayed on mobile terminal display 806, a decision is to be made as to which direction should be taken for the subsequent route segment. Preference parameters received from preferences module 814 allow analyzer module 808 to influence the direction taken, when the user preference allows a determination of the direction to be taken. If the user wishes to jog along a forest path, for example, the direction taken at a particular crossing should be the direction that yields the forest path in the shortest amount of distance. Alternatively, if analyzer module 808 does not have preference information that is adequate to render a competent decision, then route drawing module 804 may signal the user with a vibration alert and/or a voice prompt, for example, to enable a decision to be made at the crossing.

The user is given control over the route drawing session through control inputs received through command/prompt processor 812. The commands listed in Table 1, for example, provide an exemplary subset of commands that are available to control route drawing module 804. The user is also able to load preferences via preferences module 814 with his preferences prior to, or during a particular drawing session. Preferences may be communicated through the use of, for example; keypad entry, verbal commands, and pointing devices and provide a method whereby the user has indirect control of route drawing module 804. Direct user control over route drawing module 804 may also be communicated using keypad entry, verbal commands, pointing devices, as well as through the use of an acceleration/tilt sensing device in order to edit the route drawing at any incremental point along the way. The acceleration/tilt sensing device detects movement of the mobile terminal itself or detects movement of a sensing device that is directly coupled to the mobile terminal. Thus, a user is able to provide directional control input, simply by tilting the tilt sensitive device in the desired direction when prompted by route drawing module 804.

Rendering module 802 ensures that correct map area and view content are delivered to mobile terminal display 806 based upon the current view displayed by mobile terminal display 806. Initially, rendering module 802 delivers map data that allows a center datum to be displayed at the center of the user's current display resolution. The center datum being selected by the user, for example, through his current position, an entered address, an entered coordinate, or an entered landmark that is known to the area. As route drawing module 804 superimposes drawing segments near the boundaries of the current map displayed on mobile terminal display 806, for example, adjoining map data is delivered by map data server 810 to rendering module 802. The adjoining map data is then merged with existing map data by rendering module 802 to facilitate a smooth transition to the new, adjoining map data. Rendering module 802 additionally responds to "zoom in" and "zoom out" commands, whereby new map data is rendered to mobile terminal display 806 that corresponds to the new resolution directed by the user and centered at the user's directed center datum point at the new resolution.

Once the route drawing has been completed, it may be further analyzed by analyzer module 808. The final analysis may render such route information statistics as route length, total vertical distance traversed, and graphical route profile. The graphical route profile and related statistics may either be stored within the user's personal folder contained within the mobile terminal and/or within map data server 810. The completed route drawing and related profile may also be shared with other mobile terminals, so that interesting route profiles may be used by other parties in order to obtain directions to shopping centers, scenic 5-mile jogging paths, directions to the mobile terminal user's house for a Saturday night barbecue, etc.

Rendering module 802, analyzer module 808, preferences module 814, and route drawing module 804 may be implemented within map data server 810 due to the fact that these modules have high Central Processing Unit (CPU) and memory requirements. Map data and drawing data can be encoded and delivered to mobile terminal display 806 using, for example, standard streaming formats and protocols, such as motion picture expert group, multi-media standard (MPEG-4), real-time transport protocol (RTP), real-time control protocol (RTCP), or real-time streaming protocol (RTSP). In this implementation, the mobile terminal includes a user interface (UI) module that conveys the user's multimodal commands to route drawing module 804 using an application protocol/API for the control of route drawing module 804. The mobile terminal also contains a streaming client for receiving and displaying the map data and superimposed route drawings. Other embodiments include implementation of rendering module 802, analyzer module 808, preferences module 814, and route drawing module 804 within the mobile terminal depending on the type (real or imaginary), size, complexity, and semantics of the map content and the particular processing and memory capabilities of the mobile terminal.

Figure 9:
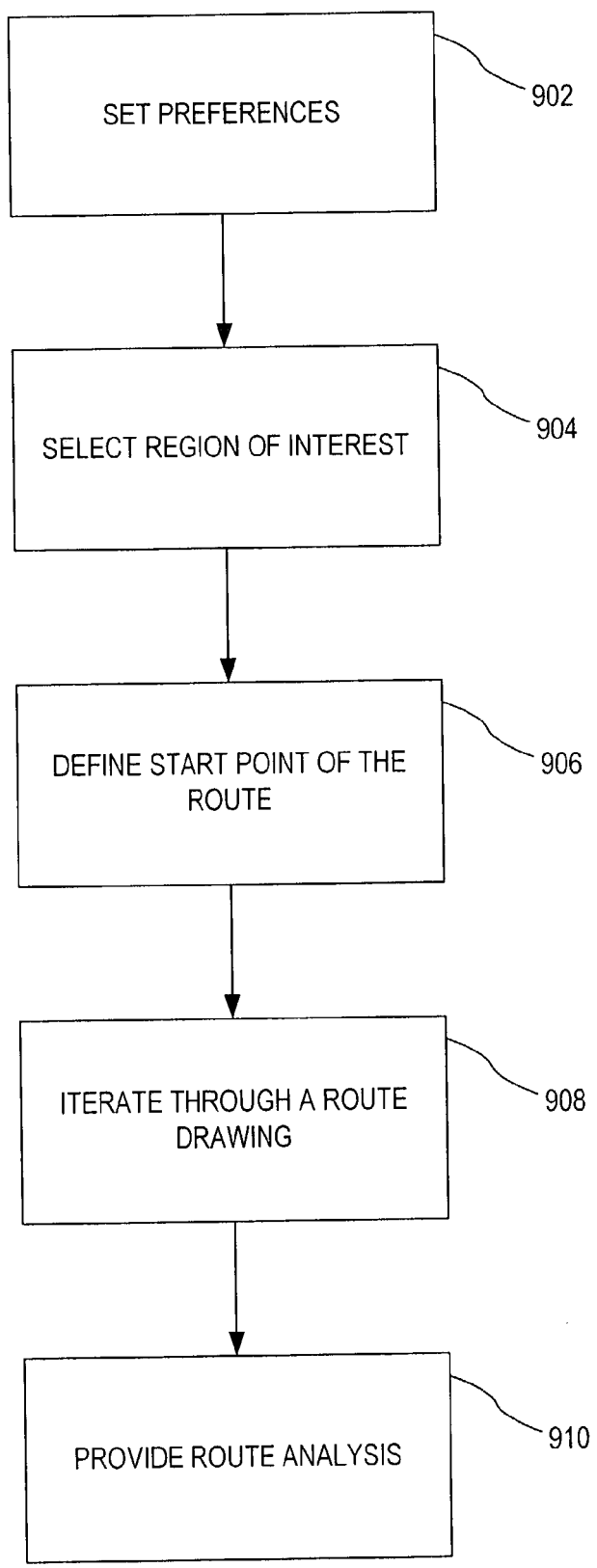
FIG. 9 illustrates a detailed flow diagram of route drawing steps taken in accordance with the principles of the invention.

FIG. 9 illustrates an exemplary flow diagram of a detailed operation of the route drawing process according to the present invention. In one embodiment, the process steps are to set preferences 902, select region of interest 904, define start point of the route 906, iterate through a route drawing 908, and provide final route analysis 910.

The user may set preferences related to route drawing in step 902 either permanently, well before any drawing task has commenced, or just before initiating a route drawing session. The user is allowed to select several options and preferences through a multi-modal user interface to include for example; preferred route type: highway, scenery road, footpath, paved bicycle route, etc. The user is allowed to select excluded route types such as for example: highways, unpaved roads, roads containing no lighting, roads void of rest stops, etc. Topographical preferences such as for example: maximum upward vertical distance, maximum downward vertical distance, etc. may also be selected. During the route drawing session, the programmed preferences allow the drawing module to prioritize different paths to provide an intelligent interaction with the user to minimize the amount of user input required. The user may, of course, override any prioritized selection of the drawing module through the use of editing tools offered by the user interface.

A particular region of interest is required in step 904 so that a route drawing session is confined to an area that is desired by the user. The region of interest may be defined by the user in any number of different ways. The region of interest may be defined by giving the name of the city, or one of the streets in the city, with text or voice input. A known landmark may also be entered to defined a regions of interest, such as for example, the Stockmann in Helsinki, Finland, or the Leaning Tower of Pisa in Italy. A user may also select a region of interest by viewing a map display of a wide area and pointing to an area within the wide area view and then zooming to the area pointed to. The user may also have access to a positioning system used to determine his current position, in which case, his current position defines the region of interest to be used.

A starting point in the drawing route is also required as in step 906. The starting point may be defined with a pointing device, such as a stylus or a mouse, on the map display itself. Alternatively, the current position of the user may be drawn on the map and that current position is then used as the starting point. A street address may also be input to the mobile terminal via, for example, voice or keypad, to define the starting point. Cursor keys, an acceleration/tilt detector, or simply a voice command may be used to select the route indicator.

An iterative route drawing sequence as in step 908 is then performed, whereby a route is drawn on the display of the user's mobile terminal, with a reasonable speed as to allow the user to interact with the process to select the precise route desired. Additionally, the route drawing updates attribute information about each segment in textual format on the mobile terminal's display, so that the user may make additional determinations about the desirability of the each specific drawing segment. Alternative embodiments allow verbal, or tactile, communication of attribute information during the Finally, the final route, complete with all of its constituent segments, may be analyzed as in step 910. The final analysis may generate data associated with the complete route that defines the route's length, total vertical deviation, estimated time to traverse route based on speed, etc. The final analysis data may further be stored in the user's personal folder within local memory, or conversely, the data may be stored remotely on a map server's hard disk. The final route may also be shared among other mobile terminal users so that route directions may be interchanged just as they would by other means. Other applications of the present invention may include emergency procedures that would provide a map of the user's current position to appropriate response personnel, in the event that the user is in need of rescue. Still other applications include the navigational capability of the present invention in aiding the planning of a trip, or perhaps logging interesting waypoints of a trip already taken.

The present invention may be used to facilitate improvement of any drawing task by first restricting the drawing to the available roads and paths as defined by the map data of interest to the user. Further, the available roads and paths may be prioritized based on user preferences such as, for example, the desirability of foot paths when jogging or the undesirability of highways while roller skating. The user is not required to perform accurate pointing and drawing tasks on the map image, but is rather required to provide simple and natural commands to the system, similar to those commands used when discussing the route with other persons. The users of the present invention are also provided multi-modal input capability, such that when one input mode is not available, another may be put in its place. For example, while out of breath during a jog, the user may simply tilt the device in the direction of the next drawing segment, instead of having to verbalize a directional command.

Figure 10:
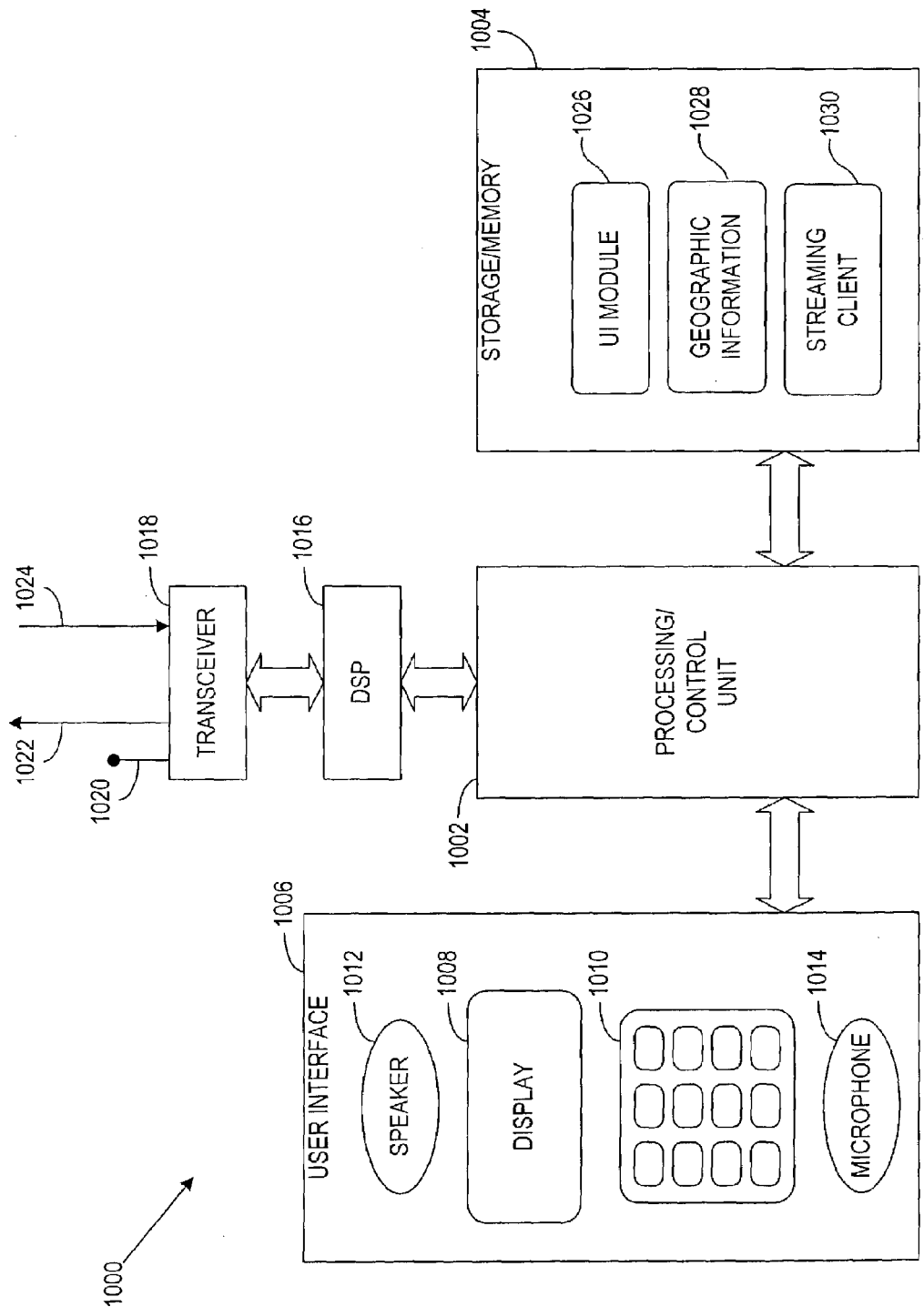
FIG. 10 illustrates a representative mobile computing arrangement suitable for initiating route drawing sessions in accordance with the present invention.

The invention is a modular invention, whereby processing functions requiring more processing power may be moved to the more powerful network servers, until such time that the mobile devices acquire additional processing power. These mobile devices may be any type of wireless device, such as wireless/cellular telephones, personal digital assistants (PDAs), or other wireless handsets, as well as portable computing devices capable of wireless communication. These landline and mobile devices utilize computing circuitry and software to control and manage the conventional device activity as well as the functionality provided by the present invention. Hardware, firmware, software or a combination thereof may be used to perform the various drawing functions described herein. An example of a representative mobile terminal computing system capable of carrying out operations in accordance with the invention is illustrated in FIG. 10. Those skilled in the art will appreciate that the exemplary mobile computing environment 1000 is merely representative of general functions that may be associated with such mobile devices, and also that landline computing systems similarly include computing circuitry to perform such operations.

The exemplary mobile computing arrangement 1000 suitable for initiating route drawing functions in accordance with the present invention may be associated with a number of different types of wireless devices. The representative mobile computing arrangement 1000 includes a processing/control unit 1002, such as a microprocessor, reduced instruction set computer (RISC), or other central processing module. The processing unit 1002 need not be a single device, and may include one or more processors. For example, the processing unit may include a master processor and associated slave processors coupled to communicate with the master processor.

The processing unit 1002 controls the basic functions of the mobile terminal, and also those functions associated with the present invention as dictated by UI module 1026, geographic information 1028, and streaming client 1030 available in the program storage/memory 1004. Thus, the processing unit 1002 is capable of initiating route drawing functions associated with the present invention, whereby route segment commands may be issued by UI module 1026 and received by a remote map server, where the route segments are subsequently superimposed upon a region of interest known to the remote map server. Once the route segments have been completely superimposed onto the region of interest, the completed route drawing may be communicated to geographic information module 1028 via streaming client 1030. The program storage/memory 1004 may also include an operating system and program modules for carrying out functions and applications on the mobile terminal. For example, the program storage may include one or more of read-only memory (ROM), flash ROM, programmable and/or erasable ROM, random access memory (RAM), subscriber interface module (SIM), wireless interface module (WIM), smart card, or other removable memory device, etc.

In one embodiment of the invention, the program modules associated with the storage/memory 1004 are stored in non-volatile electrically-erasable, programmable ROM (EEPROM), flash ROM, etc. so that the information is not lost upon power down of the mobile terminal. The relevant software for carrying out conventional mobile terminal operations and operations in accordance with the present invention may also be transmitted to the mobile computing arrangement 1000 via data signals, such as being downloaded electronically via one or more networks, such as the Internet and an intermediate wireless network(s).

The processor 1002 is also coupled to user-interface 1006 elements associated with the mobile terminal. The user-interface 1006 of the mobile terminal may include, for example, a display 1008 such as a liquid crystal display, a keypad 1010, speaker 1012, and microphone 1014. These and other user-interface components are coupled to the processor 1002 as is known in the art. Other user-interface mechanisms may be employed, such as voice commands, switches, touch pad/screen, graphical user interface using a pointing device, trackball, joystick, or any other user interface mechanism.

The mobile computing arrangement 1000 also includes conventional circuitry for performing wireless transmissions. A digital signal processor (DSP) 1016 may be employed to perform a variety of functions, including analog-to-digital (A/D) conversion, digital-to-analog (D/A) conversion, speech coding/decoding, encryption/decryption, error detection and correction, bit stream translation, filtering, etc. The transceiver 1018, generally coupled to an antenna 1020, transmits the outgoing radio signals 1022 and receives the incoming radio signals 1024 associated with the wireless device.

The mobile computing arrangement 1000 of FIG. 10 is provided as a representative example of a computing environment in which the principles of the present invention may be applied. From the description provided herein, those skilled in the art will appreciate that the present invention is equally applicable in a variety of other currently known and future mobile and landline computing environments. For example, desktop computing devices similarly include a processor, memory, a user interface, and data communication circuitry. Thus, the present invention is applicable in any known computing structure where data may be communicated via a network.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media, such as disks, optical disks, removable memory devices, semiconductor memories such as RAM, ROM, PROMS, etc. Articles of manufacture encompassing code to carry out functions associated with the present invention are intended to encompass a computer program that exists permanently or temporarily on any computer-usable medium or in any transmitting medium which transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links. From the description provided herein, those skilled in the art will be readily able to combine software created as described with appropriate general purpose or special purpose computer hardware to create a route drawing system and method in accordance with the present invention.

Figure 11:
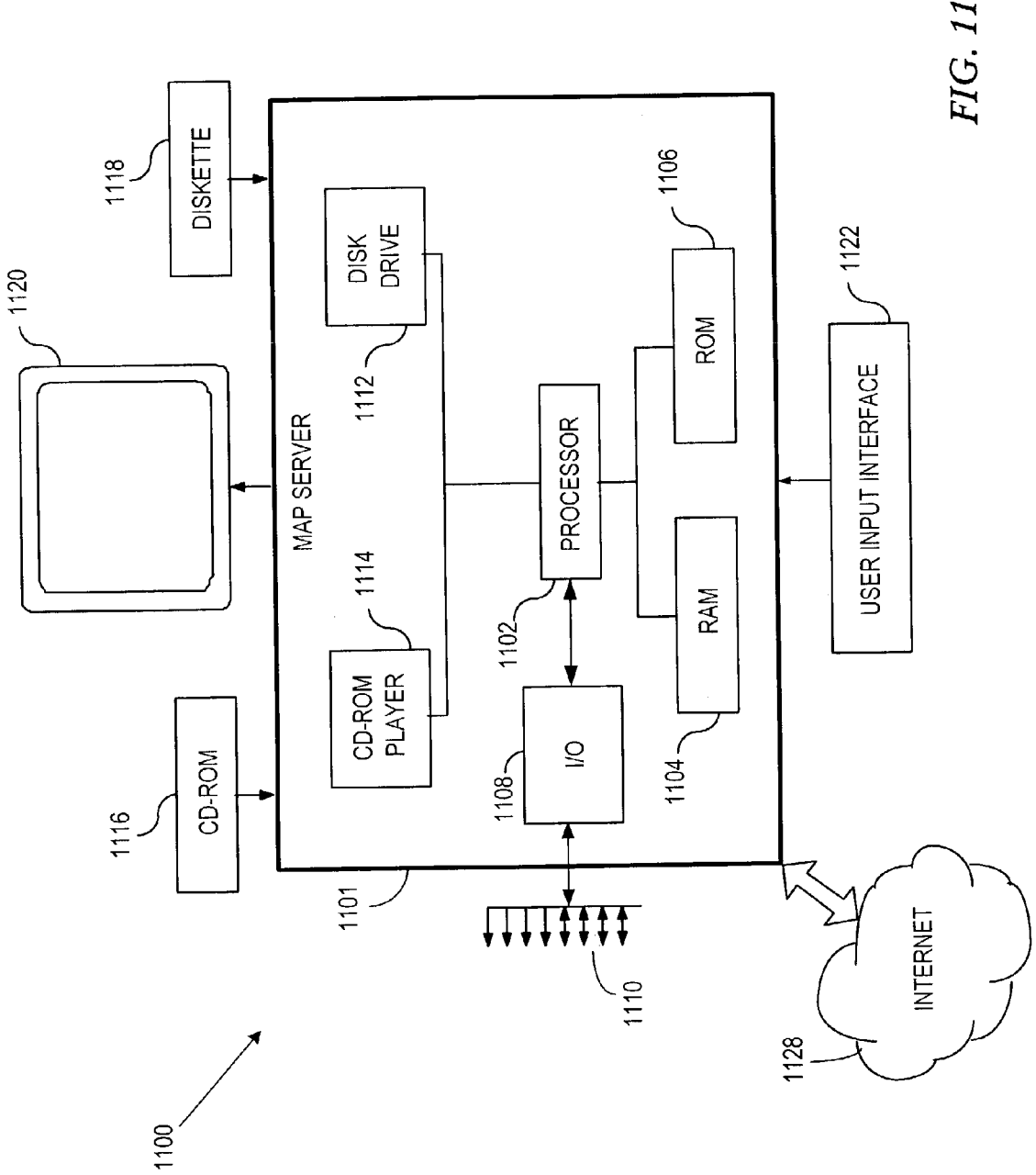
FIG. 11 is a representative computing system capable of carrying out map server support operations according to the present invention.

The network servers or other systems for providing route drawing functions in connection with the present invention may be any type of computing device capable of processing and communicating graphical information. The network servers utilize computing systems to control and manage the graphical activity. An example of a representative computing system capable of carrying out operations in accordance with the invention is illustrated in FIG. 11. Hardware, firmware, software or a combination thereof may be used to perform the various map data server functions and operations described herein. The computing structure 1100 of FIG. 11 is an example computing structure that can be used in connection with such a route drawing system.

The example computing arrangement 1100 suitable for performing the route drawing activity in accordance with the present invention includes the map server 1101, which includes a central processor (CPU) 1102 coupled to random access memory (RAM) 1104 and read-only memory (ROM) 1106. The ROM 1106 may also be other types of storage media to store programs, such as programmable ROM (PROM), erasable PROM (EPROM), etc. The processor 1102 may communicate with other internal and external components through input/output (I/O) circuitry 1108 and bussing 1110, to provide control signals and the like. For example, route segment placement commands such as those exemplified in Table 1 may be received by map server 1101 to enable placement of route segments onto a specified region of interest. Further, I/O circuitry 1108 may also receive commands indicative of the region of interest to use. External data storage devices, such as map databases, may be coupled to I/O circuitry 1108 to facilitate map/drawing functions according to the present invention, such as superimposing the route segments onto the region of interest in response to the received route segment placement commands. I/O circuitry 1108 may also serve to provide the composite graphical image consisting of the region of interest and the corresponding superimposed images. Alternatively, such databases may be locally stored in the storage/memory of the server 1101, or otherwise accessible via a local network or networks having a more extensive reach such as the Internet 1128. The processor 1102 carries out a variety of functions as is known in the art, as dictated by software and/or firmware instructions.

The map server 1101 may also include one or more data storage devices, including hard and floppy disk drives 1112, CD-ROM drives 1114, and other hardware capable of reading and/or storing information such as DVD, etc. In one embodiment, software for carrying out the graphical operations in accordance with the present invention may be stored and distributed on a CD-ROM 1116, diskette 1118 or other form of media capable of portably storing information. These storage media may be inserted into, and read by, devices such as the CD-ROM drive 1114, the disk drive 1112, etc. The software may also be transmitted to the map server 1101 via data signals, such as being downloaded electronically via a network, such as the Internet. The map server 1101 is coupled to a display 1120, which may be any type of known display or presentation screen, such as LCD displays, plasma display, cathode ray tubes (CRT), etc. A user input interface 1122 is provided, including one or more user interface mechanisms such as a mouse, keyboard, microphone, touch pad, touch screen, voice-recognition system, etc.

The map server 1101 may be coupled to other computing devices, such as the landline and/or wireless terminals via a network. The server may be part of a larger network configuration as in a global area network (GAN) such as the Internet 1128, which allows ultimate connection to the various landline and/or mobile client/watcher devices.

The foregoing description of the various embodiments of the invention has been presented for the purposes of illustration and description. It is not intended to be exhaustive or to limit the invention to the precise form disclosed. Many modifications and variations are possible in light of the above teaching. Thus, it is intended that the scope of the invention be limited not with this detailed description, but rather determined from the claims appended hereto.

What is claimed is:

1. A method for generating a route drawing on a mobile terminal display, comprising:

displaying map data indicative of a region of interest on the mobile terminal display;

setting user preferences associated with the route drawing; and facilitating user-initiated multi-modal excitations via the mobile terminal to cause multiple route segments of the route drawing to be interactively superimposed upon the region of interest, wherein the user preferences are used to prioritize placement of any one or more of the multiple route segments; and prompting user interaction through feedback to specify placement of any one or more of the multiple route segments during superimposition of the route drawing.

2. The method according to claim 1, wherein the multi-modal excitations comprise a plurality of user interface types.

3. The method according to claim 2, wherein the plurality of user interface types comprise at least one of audible, visual, and tactile.

4. The method according to claim 3, wherein the audible user interface type includes voice commands.

5. The method according to claim 3, wherein the visual user interface type includes commands entered via the display of the mobile terminal.

6. The method according to claim 3, wherein the tactile user interface type includes a vibration emanating from the mobile terminal.

7. The method according to claim 1, wherein displaying map data indicative of a region of interest comprises selecting a center datum for the region of interest.

8. The method according to claim 7, wherein selecting the center datum comprises identifying a region within a wide area map displayed on the mobile terminal display.

9. The method according to claim 7, wherein selecting the center datum comprises entering an address of a desired location.

10. The method according to claim 7, wherein selecting the center datum comprises entering a name of a landmark.

11. The method according to claim 1, wherein superimposing multiple route segments onto the region of interest comprises:

selecting a starting point on the region of interest;

placing a first route segment at the starting point; and placing consecutive route segments end to end, wherein the route segments are confined to be within pathways defined by the region of interest.

12. The method according to claim 11, wherein a wait state interrupts the placement of the next consecutive route segment due to inadequate definition of the placement.

13. The method according to claim 12, wherein a prompt is provided in response to the wait state to signal a need for additional placement parameters.

14. The method according to claim 13, wherein the prompt is signaled by at least one of audible, visual, and tactile cue.

15. The method according to claim 11, wherein attributes associated with each route segment are communicated as each route segment is placed onto the region of interest.

16. The method according to claim 1, further comprising:

analyzing the route drawing to determine final parameters indicative of the route; and communicating the final parameters.

17. The method according to claim 16, further comprising storing the route drawing and the final parameters indicative of the route.

18. The method according to claim 17, wherein the storing occurs local to the mobile terminal.

19. The method according to claim 17, wherein the storing occurs remotely on a map data server.

20. The method according to claim 1, further comprising providing a notification of route attributes relating to one or more of the route segments via a user interface of the mobile terminal, wherein the notification provided via the user interface comprises any one or more of an audio, visual, and tactile notification.

21. A computer-readable medium having instructions stored thereon which are executable by a mobile terminal for generating a route drawing on the display of the mobile terminal by performing steps comprising:

displaying map data indicative of a region of interest on the mobile terminal display;

accepting user preferences associated with the route drawing;

receiving user-initiated multi-modal excitations via the mobile terminal, the multi-modal excitations being indicative of interactive route segment placement commands; and superimposing each route segment onto the region of interest, wherein the user preferences and the interactive route segment placement commands are used to optimize placement of each route segment.

* * * * *